US009874996B2

(12) United States Patent
Holmes et al.

(10) Patent No.: US 9,874,996 B2
(45) Date of Patent: Jan. 23, 2018

(54) BIG FACE ICONS

(71) Applicants: Lonnie Holmes, Bellport, NY (US); Chris Kavander, Patchogue, NY (US)

(72) Inventors: Lonnie Holmes, Bellport, NY (US); Chris Kavander, Patchogue, NY (US)

( * ) Notice: Subject to any disclaimer, the term of this patent is extended or adjusted under 35 U.S.C. 154(b) by 0 days.

(21) Appl. No.: 14/832,254

(22) Filed: Aug. 21, 2015

(65) Prior Publication Data
US 2016/0054142 A1 Feb. 25, 2016

Related U.S. Application Data

(60) Provisional application No. 62/040,278, filed on Aug. 21, 2014.

(51) Int. Cl.
G01C 21/36 (2006.01)
G06F 3/0481 (2013.01)

(52) U.S. Cl.
CPC ...... *G06F 3/04817* (2013.01); *G01C 21/3611* (2013.01); *G01C 21/3679* (2013.01)

(58) Field of Classification Search
CPC ............ G06F 3/04817; G01C 21/3679; G01C 21/3611
See application file for complete search history.

(56) References Cited

U.S. PATENT DOCUMENTS

| | | | | |
|---|---|---|---|---|
| 6,401,034 B1* | 6/2002 | Kaplan | ............... | G01C 21/3476 340/988 |
| 6,983,203 B1* | 1/2006 | Wako | ................. | G01C 21/3682 340/988 |
| 7,487,467 B1* | 2/2009 | Kawahara | ........... | G06F 3/04817 715/762 |
| 7,546,207 B2* | 6/2009 | Nix | ..................... | G01C 21/3632 340/995.2 |
| 7,814,435 B2* | 10/2010 | Wako | .................. | G01C 21/3682 715/835 |
| 2007/0186186 A1* | 8/2007 | Both | ................... | G06F 3/04817 715/821 |
| 2008/0114534 A1* | 5/2008 | Yamazaki | .............. | G01C 21/20 701/533 |
| 2008/0125966 A1* | 5/2008 | Yamazaki | .............. | G01C 21/26 701/532 |
| 2009/0088964 A1* | 4/2009 | Schaaf | .................. | G01C 21/367 701/532 |
| 2009/0144660 A1* | 6/2009 | Wako | .................. | G01C 21/3682 715/835 |
| 2009/0313582 A1* | 12/2009 | Rupsingh | ............ | G06F 3/04817 715/835 |
| 2010/0058244 A1* | 3/2010 | Wang | .................. | G06F 3/04817 715/838 |
| 2014/0181751 A1* | 6/2014 | Won | ...................... | G06F 3/0488 715/835 |

* cited by examiner

*Primary Examiner* — Stephen Holwerda

(74) *Attorney, Agent, or Firm* — Alfred M. Walker; John F. Vodopia

(57) ABSTRACT

A navigation system which minimizes vehicle driver distraction through a series of simple, easily identifiable individual large icons separately displayed. The driver taps the screen and sees a first big non-verbal icon for an image related to the driver's query, wherein the driver hears an audio prompt and proceeds to select a desired navigation related to the driver's query.

1 Claim, 4 Drawing Sheets

US 9,874,996 B2

BIG FACE ICONS

RELATED APPLICATIONS

This application claims the benefit of provisional application No. 62/040,278 dated Aug. 21, 2014, and claims priority therefrom under 35 USC 119e

FIELD OF THE INVENTION

The present invention uses very large icons on a smart phone or tablet viewing screen to minimize driver distraction, coupled with voice.

BACKGROUND OF THE INVENTION

Icons are known in GPS navigation systems in stand alone navigation devices, such as, for example, those manufactured under the brand name TOM-TOM and others.

Among related patents include the icons of FIGS. 3,4,7 and 8 of the U.S. Pat. No. 7,546,207 B2 of Nix, which are tiny and multiple, strung along the bottom of the screen. The driver has to take his eyes off the road to select the icon and read the rest of the screen.

The same is true for the icons on the screen of U.S. Pat. No. 7,814,435 B2 of Wako, which are multiple, tiny icons shown on the traditional routing map of the navigation screen.

OBJECTS OF THE INVENTION

It is therefore an object of the present invention to simplify navigation outputs to a driver of a moving vehicle, so that driver distraction is minimized.

It is also an object of the present invention to maximize the use of simple visual images, without printed words, in providing navigation output to a driver of a moving vehicle, to further minimize driver distraction.

Other objects will become apparent from the following description of the present invention.

SUMMARY OF THE INVENTION

In contrast, the present invention describes a series of simple, easily identifiable individual large icons separately displayed. For example, the driver will tap the screen and will see a first big icon for an image of a hamburger, representing fast food in general, and at the same time a voice will say "Fast Food".

If the driver wants gas instead, he taps the screen until a generic icon for a gas pump pops up and the voice says "Gasoline". That icon might be after an earlier big icon of a steaming hot coffee cup for coffee, accompanied by the voice saying "Coffee" So the user bypasses the big icons that he or she do not want.

Then when the user gets to the large gas icon, he taps it on a special designated locational place on the viewing screen and then a secondary series of gas station logos come up, one by one, such as first a MOBIL gas large icon (with a voice announcing it), then a SHELL large icon (with a voice announcing It) and then a GULF large icon for gas (with a voice announcing it). Then if GULF is what the driver wants, at that point in time, the GPS of the user's navigation device knows where the closest GULF Gas station Is and tells the driver orally in a voice with turn by turn directions how to get there.

If the driver had selected "Coffee" then the icons for Dunkin Donuts (with a voice announcing it), Krispy Creme (with a voice announcing it) and Starbucks (with a voice announcing it) would sequentially pop up.

So with the "Big Icon" system of the present invention, there is minimal ergonomic driver distraction associated with the simple images of the "Big" icons of the present invention, with related simple accompanying voice prompts that together reduce the user's eye distraction while driving even more significantly.

In that sense, the present invention is an improvement over the prior art patents of Nix and Wako, which have distractible, intricate screen displays with multiple, tiny icons that will distract the driver's vision In a possibly unsafe manner.

DESCRIPTION OF THE DRAWINGS

The present invention can best be understood In connection with the accompanying drawings, It Is noted that the invention is not limited to the precise embodiments shown in drawings, in which.

DETAILED DESCRIPTION OF THE INVENTION

The present invention has broad applications to many technical fields for a variety of articles. For illustrative purposes only, in the embodiments of FIGS. 1, 2, 3 and 4 herein, a preferred mode for carrying out the invention is described herein, wherein a smart phone or table utilizes the Big Icons navigation system of the present invention.

The following narrative description of the Big Face Icons system of the present invention Is illustrative of the present invention, as shown in drawing FIGS. 1, 2, 3 and 4, and as described in the computer-operable source code, showing one example of implementation in the attached Appendix.

Figure 1:
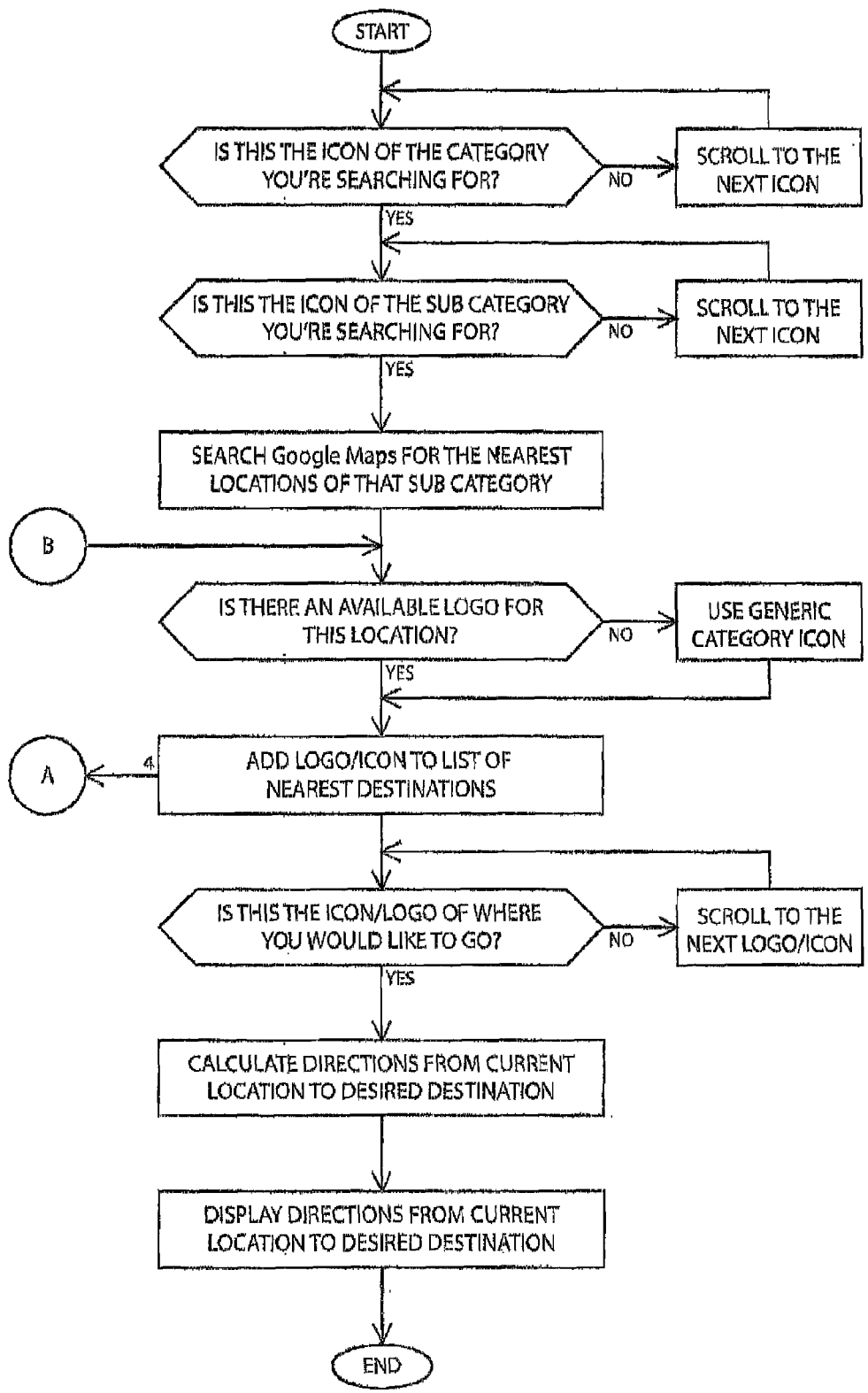
FIG. 1 is a flow chart of the Big Icons navigation system of the present invention.

For example, FIG. 1 presents a flow chart of the Big Icons navigation system of the present invention.

Figure 2:
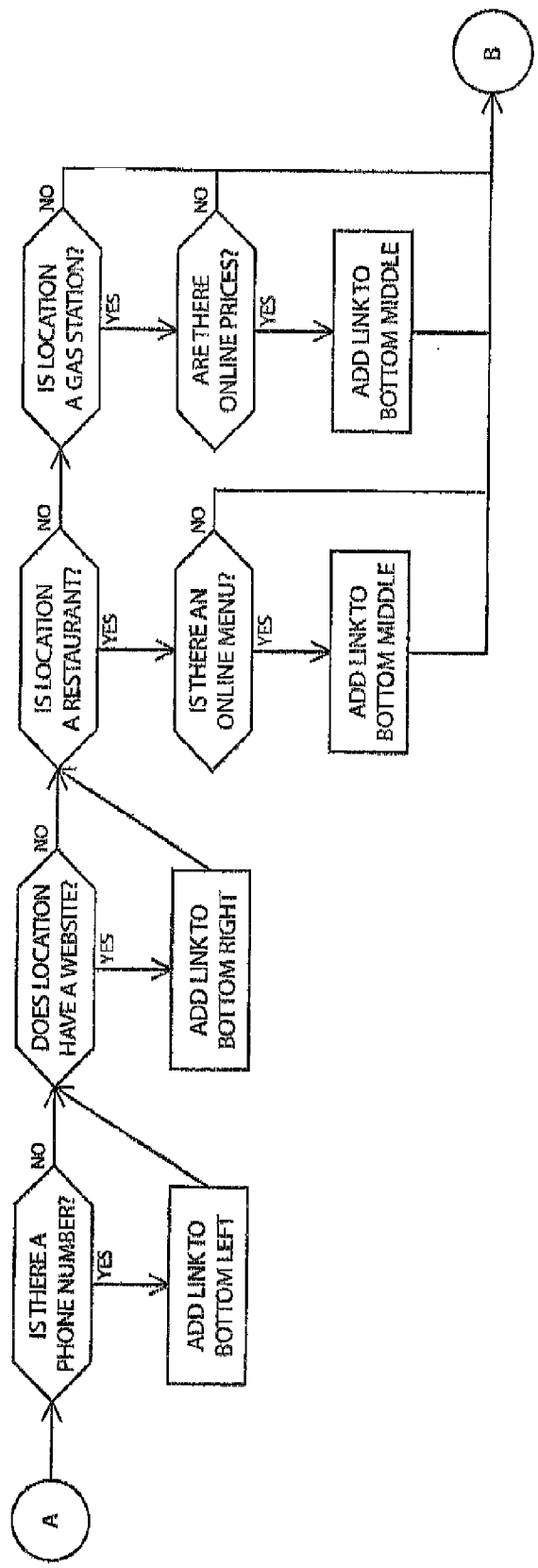
FIG. 2 is a subset of the flow chart system of FIG. 1, showing the navigation system of the present invention, starting from encircled letter "A" in FIG. 1.

FIG. 2 shows a subset of the flow chart system of FIG. 1, showing the navigation system of the present invention, starting from encircled letter "A" in FIG. 1 and ending in the encircled letter "I3".

Figure 3:
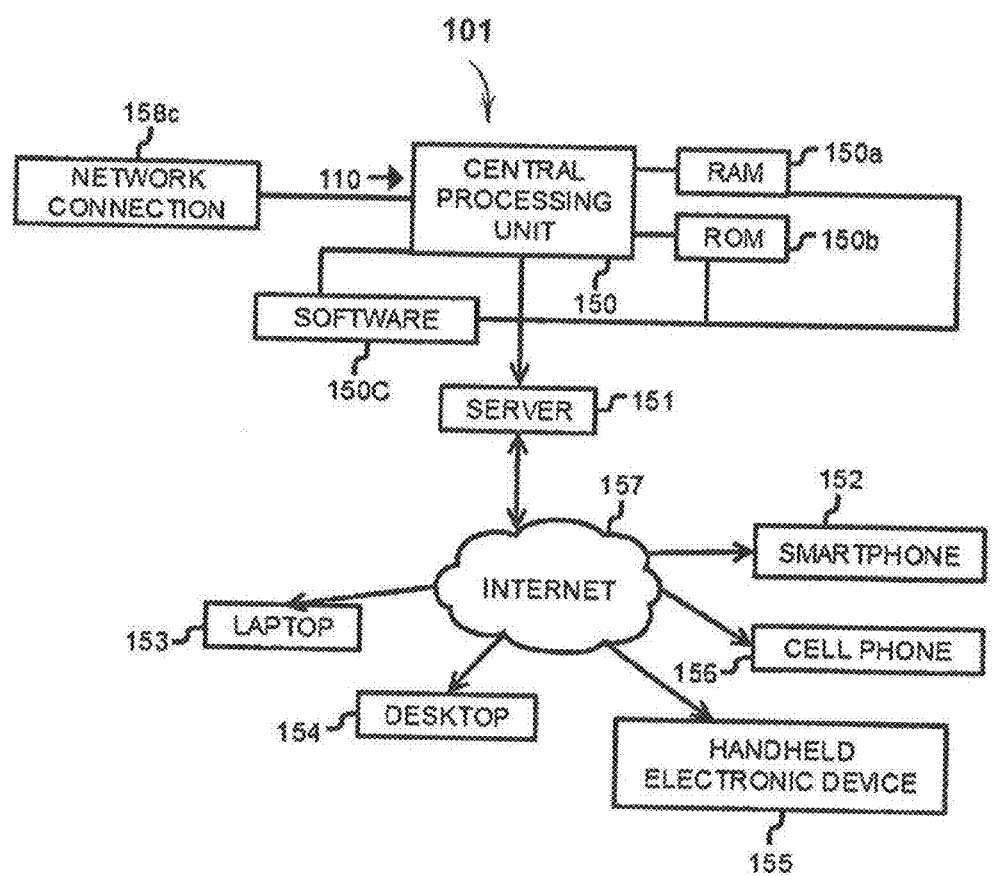
FIG. 3 is a computer system diagram of the use of the present invention on the Internet.

FIG. 3 shows a computer system diagram of the use of the present invention on the Internet.

Figure 4:
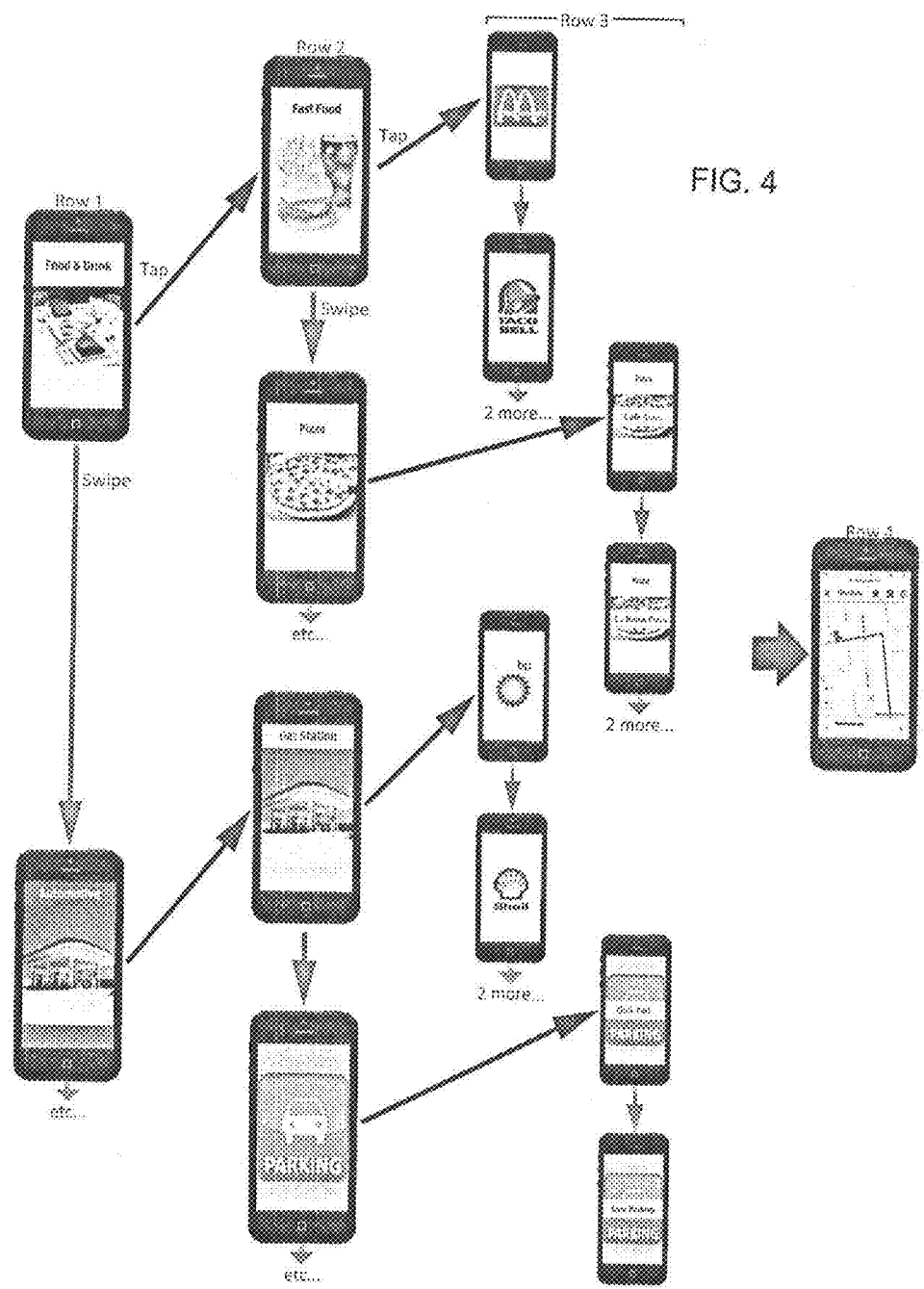
FIG. 4 is a flow chart of electronic screen images of user selected destination categories, shown on a hand held personal electronic device, such as, for example, a smart phone or tablet, showing the subsequent images shown on the viewing screen as the user selects options. The images are presented in four vertically oriented rows, Row 1, Row 2, Row 3 and Row 4, from start to finish, where Row 4 shows a navigation map of the closest chosen destination.

FIG. 4 depicts a flow chart of electronic screen images of user selected destination categories, shown on a hand held personal electronic device, such as, for example, a smart phone or tablet, showing the subsequent images shown on the viewing screen as the user selects options. The images are presented in four vertically oriented rows, Row 1, Row 2, Row 3 and Row 4, from start to finish, where Row 4 shows a navigation map of the closest chosen destination.

The following description of the Big Face Icons refers to what is shown in drawing FIG. 4, and as further explained in the flow charts of FIGS. 1 and 2, and the computer system diagram of FIG. 3.

Big Face Icons

Big Face Icons is a program designed to quickly and easily navigate to an unplanned destination or to find nearby destinations without calling or searching for an address or directions using large, recognizable Icons. The purpose of the large face icons Is to allow the user to avoid reading or typing In order to find their destination faster than typical navigation programs both on smart phones and In automobiles.

The program opens with full-screen-sized Icons each representing a different category (See Row 1). Swipe the screen to change between Icons. Once one is selected, icons of each subcategory will appear (Row 2), Once one of those is selected, icons for the four (4) nearest destinations of that subcategory, according to Google Maps, will appear (Row 3) based on your current location. Tapping on the desired destination will then automatically begin Goode navigation there from your current location (Row 4).

Following are some of the categories and subcategories
Food & Drink
  Fast Food
  Bar
  Pizza
  Restaurant
  ice Cream
  Automotive
  Gas Station
  Parking
  Auto Body Shop
  Auto Repair
  Car Rental
  Car Wash
  Emergency
  Pharmacy
  EMT
  Fire Department
  Police Department
  Hospital
  Lodging
  Hotel
  Campground
  Travel
  Rest Area
  Airport
  Ferry Terminal
  Train Station
  Business
  Bank
  ATM
  Convention Center

EXAMPLE

Computer System for Big Face Icons Navigation System and Kit

As shown in FIG. 3, a Navigation Company 101 has a computer-based system 110 which is depicted in FIG. 3 herein, by which the inventive method or application program implemented by the Bog Icon GPS Navigation System may be carried out. The navigation company 101 operates a computer readable interchangeable retail store component home navigation' kit with the computer-based system 110, which includes a central processing unit 150, which houses a processor, and other systems components (not shown expressly in the drawing figure) that implement a general purpose processing system, or computer that may execute a computer program product. The central processing unit 150 includes both Random Access Memory (RAM) 150$a$ and Read Only Memory (ROM) 150$b$ and other software 150$c$. The computer program product may comprise media, for example a compact storage medium such as a smart phone 152 or tablet 155 with a touch screen, keyboard input, mouse or voice activated input and visual and/or audio/visual display in a wireless media from the Internet 157 communicating with a server 151 communicating with the Navigation Company's central Processing unit 150 of their computer systems 110, wherein the media readable by a store customer having a handheld personal electronic device, such as a smart phone 152, laptop 153, computer 154, handheld electronic device 155 (such as a tablet pad) or cell phone 156, each having Internet access and an installed application (Le. "App"), which may be read by the processing unit 150 through a disc drive, or by any means known to the skilled artisan for providing the computer program product to the general purpose processing system for use in the computer system for the navigation kit thereby, The computer program product comprises all the respective features enabling the implementation of the inventive method for the navigation kit described herein, and which—when loaded in a computer system—Is able to carry out the computer system for the customer's implementation of the navigation kit.

It is further noted that "computer program", "software program", "program", or "software", in the present context means any expression, in any language, code or notation, of a set of instructions intended to cause a system having an information processing capability to perform a particular function either directly or after either or both of the following: (a) conversion to another language, code or notation; and/or (b) reproduction in a different material form, The computer program product 110 for the navigation kit of Navigation Company 101 may be stored on hard disk drives within processing unit 150, as mentioned, or may be located on a remote system such as a server 151 communicating through the Internet 157 with other remote processing units such as internet-capable portable electronic devices 152, 153, 154, 155 and/or 156 of customers, such as smart phones 152, laptops 153, computers 154, other handheld electronic devices 155, such as a Tablet pads, or cell phones 156 coupled to processing unit 150, via a network interface of the Internet 157 such as an Ethernet interface or other compatible device. The kit's input, such as a keyboard or touch screen or voice activated system, mouse and/or keyboard are either coupled to the processing unit 150 of the Navigation Company's computer system 110, or via the internet 157 through server 151, to provide user interaction for the computer system for the navigation kit. In use, the navigation company provides an navigation kit, whereby the Big Face Icon system kit Is used when traveling. The customer will use the computer system for the Big Face icon navigation kit to determine location of establishments associated with the Big Face icons.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

We claim:

1. A remote navigation system for minimizing driver distraction during operation of a motor vehicle, comprising:
   at least one wireless navigation system with audio and visual output;
   a gateway configured to route communications to and from a navigation network; and
   a server configured to manage the navigation network and the communications, including receiving the communications from the navigation network and sending the communications and control signals to the gateway to enable access to navigation data, wherein the communications include data related to an input from a user with at least one navigation query;
   wherein the server provides a user interlace object to an electronic processing device associated to the user that enables the user to access and control the operation of the at least one navigation query and to view and hear the navigation data in real time through sounds and through full-screen-sized icons related to the user's at least one navigation query; said full-screen-sized icons being a category set of generic goods and services, wherein each good or service each includes a further subset of trademark logos associated each category set of goods or services;
   wherein said server finds one or more near destinations that provide the same type of goods or services specified in user's navigation query; in cooperation with real-time GPS/vehicle location data and a processing unit with location-specific goods and services data, and where finding the one or more near destinations reflects the user's query categorized per the specific icons selected by the user.

* * * * *